United States Patent

[11] 3,596,364

[72] Inventor Klas Rudolf Wiklund
 Lahall, Sweden
[21] Appl. No. 810,958
[22] Filed Mar. 27, 1969
[45] Patented Aug. 3, 1971
[73] Assignee Aga Aktiebolag
 Lindingo, Sweden
[32] Priority Mar. 27, 1968
[33] Sweden
[31] 4,059/1968

[54] ARRANGEMENT FOR VEHICLE-NAVIGATING SYSTEM
10 Claims, 1 Drawing Fig.

[52] U.S. Cl. ................................................. 33/204, 340/27
[51] Int. Cl. ............................................. G01c 19/32, G01c 19/34, G01c 23/00
[50] Field of Search ............................................ 33/204; 340/27

[56] References Cited
UNITED STATES PATENTS
2,958,953  11/1960  Thornton et al. ............. 33/204

Primary Examiner—Robert B. Hull
Attorney—Larson, Taylor and Hinds

ABSTRACT: An arrangement for use in a navigating system for a vehicle includes a directional gyro, a heading indicator responsive to the gyro, and a generator for generating a signal during the movement of the vehicle. During movement of the vehicle the reading of the heading indicator is determined by a signal corresponding to the position of the gyro, under the control of a relay responsive to the presence of the generator signal. While the vehicle is stationary this relay switches the small signal due to gyro draft to cause energization of a torque motor which locks the gyro in a position corresponding to the reading of the heading indicator by nulling the drift.

PATENTED AUG 3 1971          3,596,364
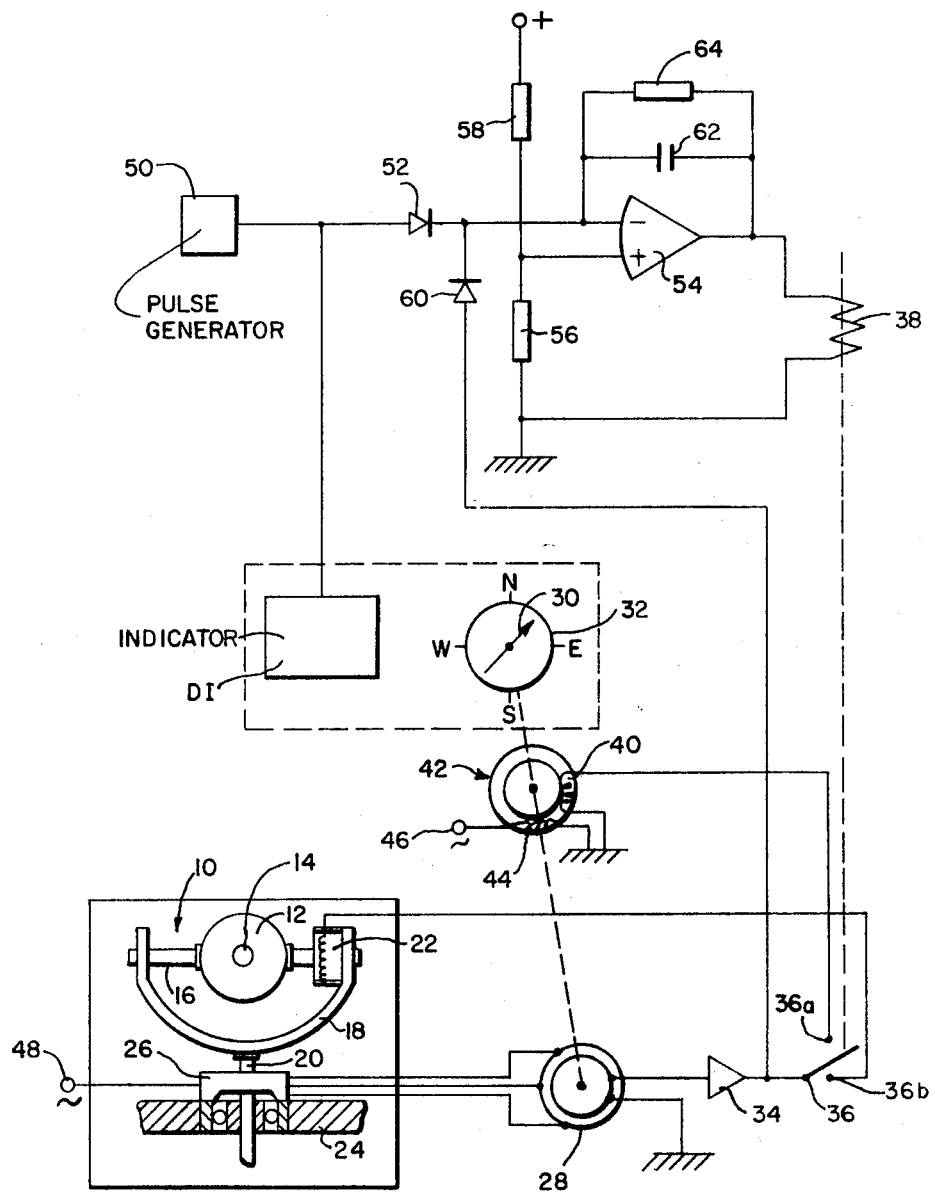
INVENTOR
KLAS R. WIKLUND
BY *Larson and Taylor*
ATTORNEYS

ARRANGEMENT FOR VEHICLE-NAVIGATING SYSTEM

FIELD OF THE INVENTION

The present invention relates to navigating systems for vehicles and more particularly to arrangements for use in such systems for providing an indication of the displacement and/or the direction of movement of the vehicle.

BACKGROUND OF THE INVENTION

A conventional arrangement for use in a navigating system for a vehicle basically comprises a gyro device, such as a directional gyro, a heading indicator which cooperates with the gyro to indicate the vehicle heading and a generator device for generating a signal in dependence upon movement of the vehicle. Such arrangements suffer the disadvantage that the gyro device tends to drift when the vehicle is stationary and this drifting correspondingly tends to diminish the reliability of the arrangement.

SUMMARY OF THE INVENTION

In accordance with the present invention an arrangement is provided which substantially eliminates gyro drift when the vehicle is stationary and thus increases the reliability of the system. In accordance with a presently preferred embodiment of the invention means are provided which are responsive to the signal generated by the generator device during movement of the vehicle for supplying a control signal in accordance with the position of the gyro to adjust the heading indicator to a reading corresponding to that position. When the vehicle is stationary, these means supply a control signal to a torque motor or the like for locking the gyro in a position corresponding to the reading of the heading indicator. Thus, upon further movement of the vehicle the initial position of the gyro device will be the same as when the vehicle stopped.

Other features and advantages of the invention will be set forth in or apparent from the detailed description of a presently preferred embodiment found hereinbelow.

BRIEF DESCRIPTION OF THE DRAWINGS

The single figure in the drawing is a schematic circuit diagram of a presently preferred embodiment of the invention.

DESCRIPTION OF THE PREFERRED EMBODIMENT

Referring to the drawing, a directional gyro device generally denoted 10 comprises a housing 12 having a gyro motor (not shown) mounted therein whose axis 14 is normally horizontal. Housing 12 is supported by a shaft 16 which is mounted in a gimbal 18 journaled for rotation on an outer shaft 20, shaft 20 being vertical in normal operation. A torque motor 22 is connected to inner shaft 16 and gimbal 18 and is adapted to apply a torque on the housing 12 about inner shaft 16. This torque will produce rotation of gyro 10 about the outer shaft 20. The position of outer gimbal 18 and associated shaft 14 relative to a fixed frame generally denoted 24 is sensed by a synchro generator device 26. The rotor of synchro generator 26 is connected to shaft 20 whereas the stator thereof is connected to frame 24.

The synchro generator 26 is connected to a similar comparison synchro device 28 which is indicated schematically. The rotor of comparison synchro 28 is mechanically connected to the indicator or pointer 30 of a heading indicator 32. The rotor of comparison synchro 28 is electrically connected through an amplifier 34 to a switch 36 controlled by a relay 38. The make-contact 36a of switch 36 is connected to a first winding 40 of a servomotor 42 for controlling the position of heading indicator pointer 30. A second winding 44 of servomotor 42 is connected to a supply terminal 46 which provides an AC reference voltage of fixed phase. A supply terminal 48 provides a voltage of the same frequency but in phase quadrature to the reference voltage at supply terminal 46, this voltage being supplied to synchro generator 26. In operation, the heading indicator 32 will provide an indication of the direction of shaft 14 of gyro 10.

A pulse generator 50 which is suitably connected to one of the wheels of the vehicle, to the universal drive shaft or the like, produces an indication of the distance traversed by the vehicle. Pulse generator 50 may be connected to a suitable indicator denoted DI which is preferably mounted in front of the operator of the vehicle. Indicator DI forms no part of the present invention and may, for example, comprise a resolver responsive to gyro 10 through means of a mechanical coupling to the shaft of heading indicator 32 such as to provide an indication of the distance traversed in the noted direction. Pulse generator 50 is connected through a rectifier 52 to a first input of an operational amplifier 54, rectifier 52 permitting passage of positive pulses to that input. A second input of operational amplifier 54 is maintained at a fixed potential by means of a potentiometer formed by resistors 56 and 58. Operational amplifier 54 provides an output when the voltage level at the first input is higher than the fixed voltage at the second input. The output of amplifier 34 is connnected through a further rectifier 60 to the first input of the operational amplifier 54 and thus the output of amplifier 34 will affect the voltage at this input. A time constant circuit comprising a capacitor 62 and a resistor 64 is connected between the first input and the output of operational amplifier 54.

The output of operational amplifier 54 is connnected to relay 38 which, as stated, controls the position of switch 36. With switch 38 in the second position thereof, wherein switch 36 completes a connection through a second contact 36b, the output of amplifier 34 is connected to a control winding of torque motor 22. It will be understood that torque motor 22 further includes a second winding (not shown) to which an AC voltage of fixed frequency and phase is supplied.

Considering the operation of the arrangement described hereinabove, during movement of the vehicle pulses are supplied from pulse generator 50 to operational amplifier 54. Further, where the heading of the vehicle changes an output signal will be delivered from comparison synchro 28 through amplifier 34 to the first input of operational amplifier 54. This signal is a function of the signal produced by synchro generator 26 which senses the position of gyro 10 and transmits a corresponding signal to the stator of comparison synchro 28. The output signal of amplifier 34 is added to that supplied by pulse generator 50 at the first input of operational amplifier 54 and causes activation of operational amplifier 54 and resultant energization of relay 38. With relay 38 energized a circuit will be completed through make-contact 36a to servomotor 40. Servomotor 40 will cause pointer 30 of heading indicator 32 to move to a position corresponding to the output of comparison synchro 28 to provide a heading indication. Servo 40 will also cause rotation of the rotor of comparison synchro 28 which is mechanically coupled to the shaft of pointer 30 to balance out the output of synchro 28 in accordance with conventional servomechanism principles.

When the vehicle stops relay 38 will be deenergized after an interval determined by the time constant circuit formed by resistor 64 and capacitor 62. With relay 38 deenergized the output of amplifier 34 is connected through switch contact 36b to torque motor 22 instead of to servo motor 40. If the gyro 10 should drift because of frictional forces or the like such that shaft 14 is no longer in a position corresponding to the reading of pointer 30, this change in position will result in an output at comparison synchro 28. This output is passed through amplifier 34 to torque motor 22 and is of an amplitude and phase such that torque motor 22 will correct the position of gyro 10 in accordance with the reading of pointer 30. Thus gyro 10 will be "caged" or locked in accordance with the heading indicated by heading indicator 32 when the vehicle is stationary. It is noted that with the gyro 10 in this position the output of comparison synchro 28 is of a value too low to affect operation of operational amplifier 54, under normal gyro drifts. It is possible, however, that the vehicle heading could change when there is no output from the pulse generator, e.g., in the case of a stopped vehicle which is transported by a ferry. In such an instance, the signal from synchro 28 as amplified by amplifier 34 will be sufficient to overcome the reference bias and actuate operational amplifier 54 so that the locking of the gyro 10 is broken and the heading indicator 32 is made to follow the change in position of the gyro 10. When the new heading is attained, the output from the amplifier 34 will again be of value too low to affect the operation of operational amplifier 54 and gyro 10 will be locked onto this new heading. It is noted that it is also possible to connect rectifier 60 to the input of amplifier 34 rather than to the output.

It will be understood by those skilled in the art that the embodiment of the invention shown and described herein is subject to various other modifications without departing from the scope and spirit of the invention. Accordingly, it should be understood that the invention is not limited by the exemplary embodiment shown and described.

I claim:

1. An arrangement for use with a navigating system for a vehicle comprising gyro means, indicator means cooperating with the gyro means for providing an indication of the heading of the vehicle, and generator means for generating a signal in response to movement of the vehicle, wherein the improvement comprises control means, when energized, for controlling the position of the gyro means, and means responsive to the signal produced by the generator means for supplying, during movement of the vehicle, a control signal to the heading indicator means corresponding to the position of the gyro means to effect adjustment of the indicator means in accordance with said position, and, when the vehicle is stationary, for supplying a control signal to said control means in accordance with the reading of the heading indicator means, said control means controlling the position of the gyro means in accordance with said reading.

2. An arrangement as claimed in claim 1 wherein said control means comprises a torque motor.

3. An arrangement as claimed in claim 1 wherein said gyro means comprises directional gyro means.

4. An arrangement as claimed in claim 1 wherein said generating means comprises means connected to said signal-responsive means for generating a signal corresponding to the distance traversed by the vehicle.

5. An arrangement as claimed in claim 4 wherein said generator means comprises a pulse generator.

6. An arrangement as claimed in claim 1 wherein said signal-responsive means includes a comparison circuit for generating a signal in accordance with the difference in positions between the gyro means and the heading indicator means, relay means, and control means for controlling said relay means responsive to the output of said comparison circuit and to the signal generated by said generator means.

7. An arrangement as claimed in claim 6 wherein said comparison circuit comprises a synchro generator responsive to a heading-dependent shaft of the gyro means, comparison synchro means connected to said synchro generator and to the heading indicator means, and wherein said relay means comprises a switch connected to the output of said comparison synchro means.

8. An arrangement as claimed in claim 7 further comprising a servomotor for actuating the heading indicator means, said switch having a first position for connecting the output of said comparison circuit to said servomotor to actuate said indicator means and a second position for connecting the output of said comparison circuit to said control means and for said gyro means.

9. An arrangement as claimed in claim 1 wherein said signal responsive means includes an input circuit including an operational amplifier and means for maintaining a first input of said operational amplifier at a fixed potential, said operational amplifier including a second input for receiving the signal produced by the generator means.

10. An arrangement as claimed in claim 9 wherein the generator means comprises a pulse generator, said signal-responsive means further comprising a time constant circuit connected between the output and said second input of said operational amplifier for determining the maximum time interval between pulses applied to said operational amplifier and relay means responsive to said operational amplifier.